United States Patent
Chu et al.

(10) Patent No.: US 9,906,033 B2
(45) Date of Patent: Feb. 27, 2018

(54) CONSENSUS-BASED POWER CONTROL APPARATUS

(71) Applicant: NATIONAL TSING HUA UNIVERSITY, Hsinchu (TW)

(72) Inventors: Chia-Chi Chu, Hsinchu (TW); Lin-Yu Lu, Hsinchu (TW)

(73) Assignee: NATIONAL TSING HUA UNIVERSITY, Hsinchu (TW)

( * ) Notice: Subject to any disclaimer, the term of this patent is extended or adjusted under 35 U.S.C. 154(b) by 380 days.

(21) Appl. No.: 14/702,844

(22) Filed: May 4, 2015

(65) Prior Publication Data
US 2016/0259399 A1 Sep. 8, 2016

(30) Foreign Application Priority Data

Mar. 6, 2015 (TW) .............................. 104107155 A (51) Int. Cl.
*H02J 3/38* (2006.01)
*H02J 3/48* (2006.01)
*H02J 3/50* (2006.01)

(52) U.S. Cl.
CPC ......... *H02J 3/38* (2013.01); *H02J 3/48* (2013.01); *H02J 3/50* (2013.01)

(58) Field of Classification Search
USPC .............................................. 700/286–300
See application file for complete search history.

(56) References Cited

U.S. PATENT DOCUMENTS

| 5,596,492 A * | 1/1997 | Divan ....................... H02J 3/14 307/64 |
| 2015/0311716 A1* | 10/2015 | He ............................. H02J 3/16 700/287 |
| 2016/0011569 A1* | 1/2016 | Schultz .................. G05B 11/42 700/287 |

* cited by examiner

*Primary Examiner* — Robert Fennema
*Assistant Examiner* — Marzia T Monty
(74) *Attorney, Agent, or Firm* — Amin, Turocy & Watson LLP (57) ABSTRACT

A consensus-based power control apparatus is provided, which includes a real power control module and a reactive power control module. A real power consensus signal between a first power generating apparatus and a second power generating apparatus is provided and a frequency restoration signal is generated according to the real power consensus signal, thereby allowing the real power control module to generate a real power output signal. A reactive power consensus signal between the first power generating apparatus and the second power generating apparatus is provided and a voltage differential restoration signal is generated according to the reactive power consensus signal, thereby allowing the reactive power control module to generate a reactive power output signal. Therefore, the invention can control real power and reactive power input signals (i.e., actual real power and reactive power outputs) of the first power generating apparatus in a grid system.

11 Claims, 8 Drawing Sheets

CONSENSUS-BASED POWER CONTROL APPARATUS

BACKGROUND OF THE INVENTION

1. Field of the Invention

The present invention relates to power control apparatuses, and more particularly, to a consensus-based power control apparatus applicable to a grid system having at least two power generating apparatuses.

2. Description of Related Art

In a grid system constituted by a plurality of power generating apparatuses such as synchronous generators, wind power generators and water power generators, since the power generating apparatuses usually generate significantly different real power input signals (representing actual real power outputs of the apparatuses) or reactive power input signals (representing actual reactive power outputs of the apparatuses) and the grid system lacks an ability to distribute the real power input signals and the reactive power input signals of the power generating apparatuses, the real power input signals and the reactive power input signals of the power generating apparatuses cannot become (or tend to become) uniform or have predetermined ratios, thus adversely affecting the overall energy stability of the grid system.

Figure 1:
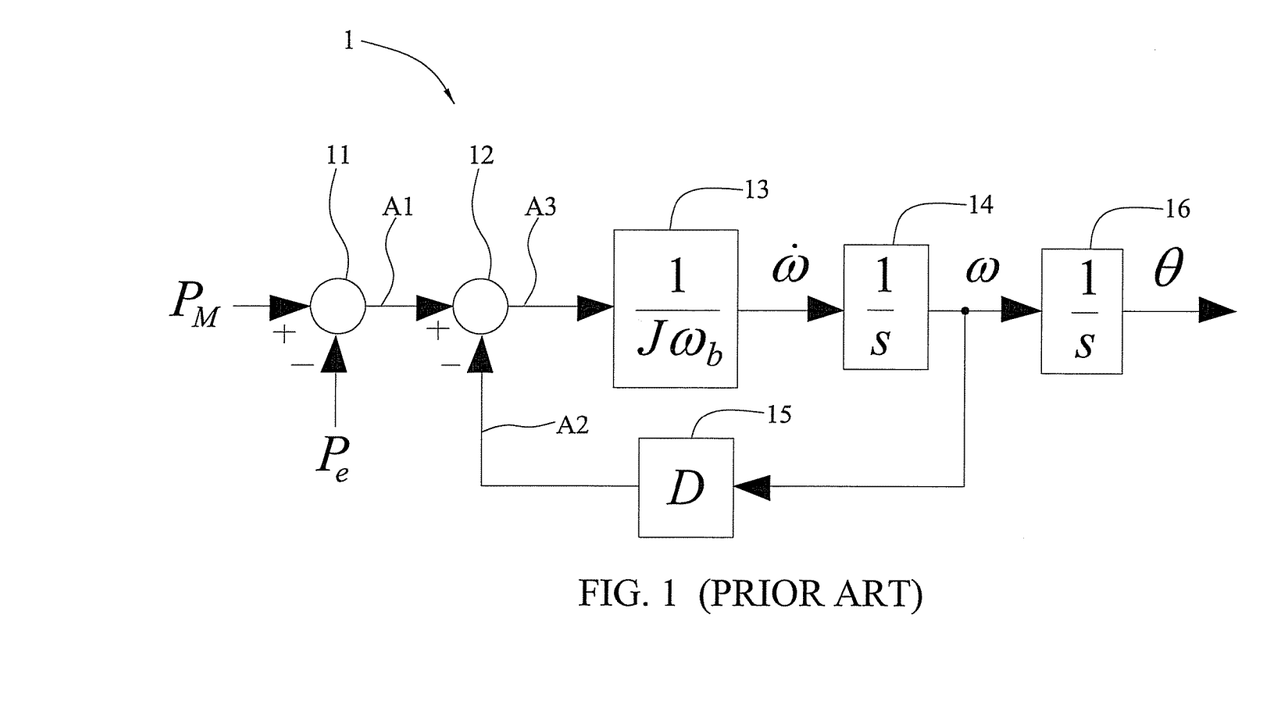
FIG. 1 is a schematic block diagram of a conventional synchronous generator.

FIG. 1 is a schematic block diagram of a conventional synchronous generator 1. Referring to FIG. 1, the synchronous generator 1 has a first subtraction unit 11, a second subtraction unit 12, an inertia unit 13, a first integral unit 14, a friction unit 15 and a second integral unit 16.

The first subtraction unit 11 subtracts a real power input signal $P_e$ from a real power command signal $P_M$ to generate a real power difference signal A1. The second subtraction unit 12 subtracts a feedback frequency signal A2 from the real power difference signal A1 to generate a real power output signal A3. The inertia unit 13 multiplies the real power output signal A3 by an inertia constant to generate a frequency differential signal $\dot{\omega}$. The first integral unit 14 integrates the frequency differential signal $\dot{\omega}$ to generate a frequency signal $\omega$. The friction unit 15 multiplies the frequency signal $\omega$ by a friction constant to generate the feedback frequency signal A2. The second integral unit 16 integrates the frequency signal $\omega$ to generate an electric angle signal $\theta$.

However, when a plurality of synchronous generators 1 are applied in a grid system, since the grid system lacks the ability to distribute real power input signals $P_e$ and reactive power input signals (not shown) of the synchronous generators 1, the real power input signals Pe and the reactive power input signals of the synchronous generators 1 cannot become (or tend to become) uniform or have predetermined ratios. Consequently, the overall energy of the grid system lacks stability.

Therefore, there is a need to provide a consensus-based power control apparatus so as to overcome the above-described drawbacks.

SUMMARY OF THE INVENTION

The present invention provides a consensus-based power control apparatus that can control real power and reactive power input signals of a power generating apparatus in a grid system.

The consensus-based power control apparatus of the present invention is applicable to a grid system having a first power generating apparatus and at least a second power generating apparatus. The power control apparatus comprises a real power control module providing a real power command signal and receiving a real power input signal of the first power generating apparatus. The real power control module comprises: a real power consensus unit for providing a real power consensus signal between the first power generating apparatus and the second power generating apparatus; and a frequency restoration unit for generating a frequency restoration signal according to the real power consensus signal, thereby allowing the real power control module to generate a first real power output signal of the first power generating apparatus according to the real power command signal, the real power input signal and the frequency restoration signal. The power control apparatus further comprises a reactive power control module providing a reactive power command signal and receiving a reactive power input signal of the first power generating apparatus. The reactive power control module comprises: a reactive power consensus unit for providing a reactive power consensus signal between the first power generating apparatus and the second power generating apparatus; and a voltage restoration unit for generating a voltage differential restoration signal according to the reactive power consensus signal, thereby allowing the reactive power control module to generate a reactive power output signal of the first power generating apparatus according to the reactive power command signal, the reactive power input signal and the voltage differential restoration signal.

The real power control module can further comprise: a first subtraction unit for subtracting the real power input signal from the real power command signal to generate a real power difference signal; and a second subtraction unit for subtracting the frequency restoration signal from the real power difference signal to generate the first real power output signal.

The real power control module can further comprise a first addition unit and the frequency restoration unit can further comprise a first integral sub-unit. The first addition unit adds the first real power output signal and the real power consensus signal, the first integral sub-unit integrates the output of the first addition unit, and the frequency restoration unit multiplies the output of the first integral sub-unit by a frequency restoration constant to generate the frequency restoration signal.

The real power control module can further comprise a third subtraction unit for subtracting a first electric angle differential signal from the first real power output signal to generate a second real power output signal of the first power generating apparatus.

The real power control module can further comprise: a virtual inertia unit for multiplying the second real power output signal by an inertia constant to generate a frequency differential signal; and a second integral unit for integrating the frequency differential signal to generate a second electric angle differential signal, thereby allowing the real power control module to multiply the second electric angle differential signal by a real power droop constant to generate the first electric angle differential signal.

The real power control module can further comprise: a second addition unit for adding the second electric angle differential signal and a frequency constant; and a third integral unit for integrating the output of the second addition unit to generate an electric angle signal.

The reactive power control module can further comprise: a fourth subtraction unit for subtracting the reactive power input signal from the reactive power command signal to generate a reactive power difference signal; and a fifth subtraction unit for subtracting the voltage differential restoration signal from the reactive power difference signal to generate the reactive power output signal.

The reactive power control module can further comprise a third addition unit and the voltage restoration unit can further comprise a fourth integral sub-unit. The third addition unit adds the reactive power output signal and the reactive power consensus signal, the fourth integral sub-unit integrates the output of the third addition unit, and the voltage restoration unit multiplies the output of the fourth integral sub-unit by a voltage restoration constant to generate the voltage differential restoration signal.

The reactive power control module can further comprise a fifth integral unit. The reactive power control module multiplies the reactive power output signal by a reactive power droop constant to generate a voltage differential signal and the fifth integral unit integrates the voltage differential signal to generate a voltage difference signal.

The reactive power control module can further comprise: a fourth addition unit for adding the voltage difference signal and a voltage constant to generate a voltage command signal; and a sixth subtraction unit for subtracting a voltage feedback signal from the voltage command signal to generate a voltage error signal.

The power control apparatus can further comprise a modulation module having a proportional integral (PI) control unit for changing a voltage error signal of the reactive power control module into a current command signal and a predictive current control unit for generating a current output signal according to the current command signal and a current feedback signal.

The modulation module can further have: a transformation frame unit for generating a control force signal according to the current output signal and an electric angle signal of the real power control module; and a PWM (Pulse Width Modulation) unit for changing the control force signal into a PWM signal.

Therefore, the consensus-based power control apparatus of the present invention can be applied in a grid system having a first power generating apparatus and at least a second power generating apparatus connected or adjacent to the first power generating apparatus. The real power control module of the power control apparatus has a real power consensus unit for providing a real power consensus signal between the first power generating apparatus and the second power generating apparatus, and the reactive power control module of the power control apparatus has a reactive power consensus unit for providing a reactive power consensus signal between the first power generating apparatus and the second power generating apparatus. As such, the present invention can control real power and reactive power input signals of the first power generating apparatus through the real power and reactive power consensus signals.

Further, when a plurality of power control apparatuses of the present invention are applied in a grid system having a plurality of power generating apparatuses, the power control apparatuses are capable of distributing real power and reactive power input signals of the power generating apparatuses so as to cause the real power and reactive power input signals of the power generating apparatuses to become (or tend to become) uniform or have predetermined ratios and cause the overall energy of the grid system to achieve stability.

Furthermore, the power control apparatus of the present invention has a virtual inertia unit for providing a suitable inertia for the first power generating apparatus so as to cause frequency signals of the first power generating apparatus to have smaller jitter and greater stability.

DETAILED DESCRIPTION OF PREFERRED EMBODIMENTS

The following illustrative embodiments are provided to illustrate the disclosure of the present invention, these and other advantages and effects can be apparent to those in the art after reading this specification.

Figure 2:
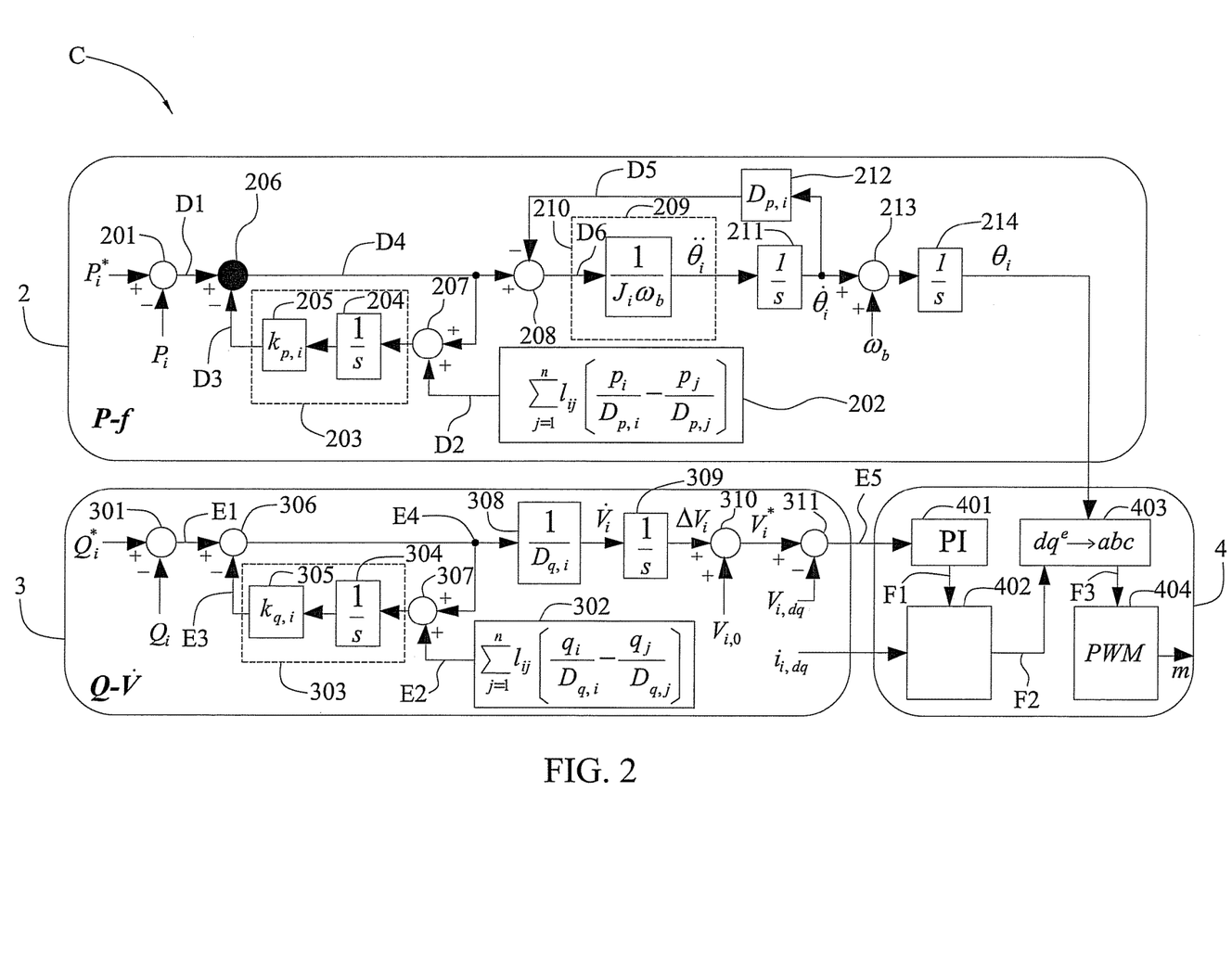
FIG. 2 is a schematic block diagram of a consensus-based power control apparatus of the present invention.
Figure 3:
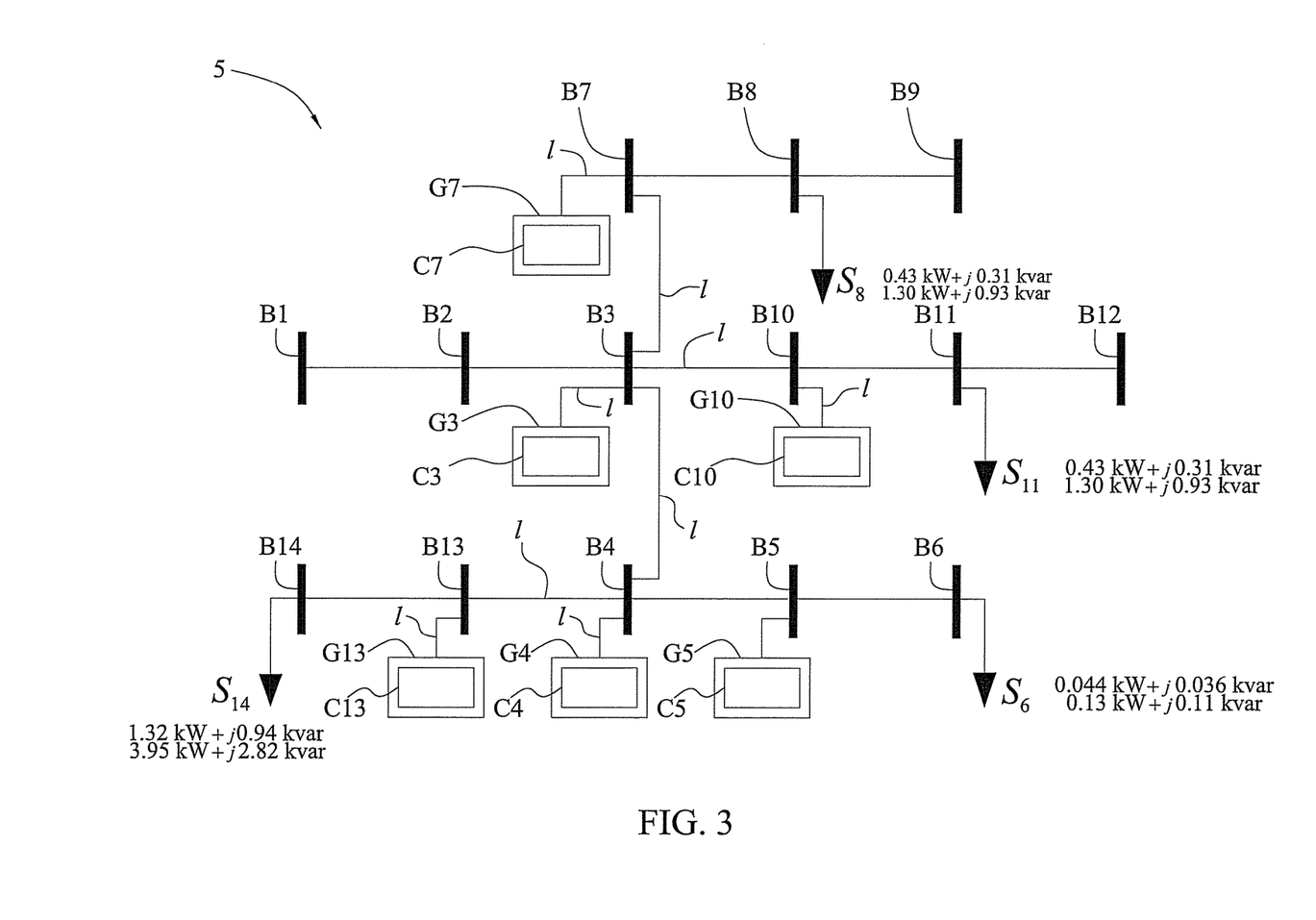
FIG. 3 is a schematic block diagram showing application of a plurality of power control apparatuses of the present invention in a plurality of power generating apparatuses of a grid system.

FIG. 2 is a schematic block diagram of a consensus-based power control apparatus C of the present invention, and FIG. 3 is a schematic block diagram showing application or mounting of a plurality of power control apparatuses C (for example, six power control apparatuses C3, C4, C5, C7, C10 and C13) of the present invention in a plurality of power generating apparatuses G (for example, six power generating apparatuses G3, G4, G5, G7, G10 and G13) of a grid system 5, respectively.

In the present embodiment, the grid system 5 of FIG. 3 has a plurality of buses B (for example, fourteen buses B1 to B14) and a plurality of transmission lines l for electrically connecting the power generating apparatuses G, the power control apparatuses C and a plurality of loads S (for example, four loads S6, S8, S11 and S14).

Referring to FIG. 3, the load S6 when light consumes a real power of 0.044 kW and a reactive power of 0.036 kvar and when heavy consumes a real power of 0.13 kW and a reactive power of 0.11 kvar. The load S8 and the load S11 when light consume a real power of 0.43 kW and a reactive power of 0.31 kvar and when heavy consume a real power of 1.30 kW and a reactive power of 0.93 kvar. The load S14 when light consumes a real power of 1.32 kW and a reactive power of 0.94 kvar and when heavy consumes a real power of 3.95 kW and a reactive power of 2.82 kvar.

Referring to FIGS. 2 and 3, the power control apparatuses C can be power control circuits, synchronverters or distributed interface converters (DICs). The grid system 5 can be an isolated micro-grid system. The power generating apparatuses G can be synchronous generators, wind power generators, water power generators, thermal power generators or nuclear power generators.

In an embodiment, the grid system 5 of FIG. 3 only has a first power generating apparatus and at least a second power generating apparatus. For example, the first power generating apparatus is any one of the power generating apparatuses G (for example, G3, G4, G5, G7, G10 and G13), and the second power generating apparatus is at least one of the power generating apparatuses G that is adjacent to the first power generating apparatus. Further, the first power generating apparatus is electrically or signally connected to the second power generating apparatus through at least one transmission line 1. For example, if the first power generating apparatus of FIG. 3 is G3, the second power generating apparatuses are G4, G7 and G10. In another example, if the first power generating apparatus of FIG. 3 is G13, the second power generating apparatus is G4.

Referring to FIG. 2, the power control apparatus C mainly has a real power control module 2 and a reactive power control module 3. For purposes of simplification, the power generating apparatus G13 of FIG. 3 is exemplified as a first power generating apparatus, the power generating apparatus G4 is a second power generating apparatus, and the power control apparatus C13 serves as the power control apparatus C of FIG. 2.

Referring to FIGS. 2 and 3, the power control apparatus C13 (C) is electrically connected to the power generating apparatus G13 or mounted inside the power generating apparatus G13. The power control apparatus C13 (C) and the power generating apparatus G13 are adjacent to the power generating apparatus G4 and electrically or signally connected to the power generating apparatus G4 through the transmission line 1.

The real power control module 2 of the power control apparatus C13 (C) provides a real power command signal $P_i^*$ and receives a real power input signal $P_i$ of the power generating apparatus G13. Further, the real power control module 2 has a real power consensus unit 202 for providing a real power consensus signal D2 between the power generating apparatus G13 and the power generating apparatus G4, and a frequency restoration unit 203 for generating a frequency restoration signal D3 according to the real power consensus signal D2. According to the real power command signal $P_i^*$, the real power input signal $P_i$ and the frequency restoration signal D3, the real power control module 2 generates a first real power output signal D4 of the power generating apparatus G13.

In particular, the real power control module 2 further has a first subtraction unit 201 for subtracting the real power input signal $P_i$ from the real power command signal $P_i^*$ to generate a real power difference signal D1. The first subtraction unit 201 can be a hardware subtractor or a software subtraction program.

The real power control module 2 further has a second subtraction unit 206. The second subtraction unit 206 is electrically or signally connected to the first subtraction unit 201 for subtracting the frequency restoration signal D3 from the real power difference signal D1 and thereby generating the first real power output signal D4. The second subtraction unit 206 can be a hardware subtractor or a software subtraction program.

The real power control module 2 further has a first addition unit 207. The first addition unit 207 is electrically or signally connected to the second subtraction unit 206 and the real power consensus unit 202 for adding the first real power output signal D4 and the real power consensus signal D2. The first addition unit 207 can be a hardware adder or a software addition program. The second subtraction unit 206, the first addition unit 207 and the frequency restoration unit 203 constitute a first closed loop.

The frequency restoration unit 203 has a first integral sub-unit 204. The first integral sub-unit 204 is electrically or signally connected to the first addition unit 207, for integrating the output of the first addition unit 207. The first integral sub-unit 204 can be a hardware integrator or a software integral program. Further, the frequency restoration unit 203 multiplies the output of the first integral sub-unit 204 by a frequency restoration constant 205 to generate the frequency restoration signal D3. The frequency restoration signal D3 is used to restore the frequency of the first real power output signal D4.

The real power control module 2 further has a third subtraction unit 208. The third subtraction unit 208 is electrically or signally connected to the second subtraction unit 206 for subtracting a first electric angle differential signal D5 from the first real power output signal D4 and thereby generating a second real power output signal D6 of the power generating apparatus G13. The third subtraction unit 208 can be a hardware subtractor or a software subtraction program.

The real power control module 2 further has a virtual inertia unit 209. The virtual inertia unit 209 is electrically or signally connected to the third subtraction unit 208 for multiplying the second real power output signal D6 by an inertia constant 210 and thereby generating a frequency differential signal $\ddot{\theta}_i$. As such, a suitable rotational inertia J is added to the second real power output signal D6 of the power generating apparatus G13. The rotational inertia J is not equal to zero. That is, $J \neq 0$.

The real power control module 2 further has a second integral unit 211. The second integral unit 211 is electrically or signally connected to the virtual inertia unit 209 for integrating the frequency differential signal $\ddot{\theta}_i$ and thereby generating a second electric angle differential signal $\dot{\theta}_i$. Further, the real power control module 2 multiplies the second electric angle differential signal $\dot{\theta}_i$ by a real power droop constant 212 to generate the first electric angle differential signal D5. The second integral unit 211 can be a hardware integrator or a software integral program. The third subtraction unit 208, the virtual inertia unit 209 and the second integral unit 211 form a second closed loop.

The real power control module 2 further has a second addition unit 213. The second addition unit 213 is electrically or signally connected to the second integral unit 211 for adding the second electric angle differential signal $\dot{\theta}_i$ and a frequency constant $\omega_b$. The second addition unit 213 can be a hardware adder or a software addition program.

The real power control module 2 further has a third integral unit 214. The third integral unit 214 is electrically or signally connected to the second addition unit 213 for integrating the output of the second addition unit 213 and thereby generating an electric angle signal $\theta_i$. The third integral unit 214 can be a hardware integrator or a software integral program.

Further, the reactive power control module 3 of the power control apparatus C13 (C) provides a reactive power command signal $Q_i^*$ and receives a reactive power input signal $Q_i$ of the power generating apparatus G13. Further, the reactive power control module 3 has a reactive power consensus unit 302 for providing a reactive power consensus signal E2 between the power generating apparatus G13 and the power generating apparatus G4, and a voltage restoration unit 303 for generating a voltage differential restoration signal E3 according to the reactive power consensus signal E2. According to the reactive power command signal $Q_i^*$, the reactive power input signal $Q_i$ and the voltage differential restoration signal E3, the reactive power control module 3 generates a reactive power output signal E4 of the power generating apparatus G13.

In particular, the reactive power control module 3 further has a fourth subtraction unit 301 for subtracting the reactive power input signal $Q_i$ from the reactive power command signal $Q_i^*$ to generate a reactive power difference signal E1. The fourth subtraction unit 301 can be a hardware subtractor or a software subtraction program.

The reactive power control module 3 further has a fifth subtraction unit 306. The fifth subtraction unit 306 is electrically or signally connected to the fourth subtraction unit 301 for subtracting the voltage differential restoration signal E3 from the reactive power difference signal E1 and thereby generating the reactive power output signal E4. The fifth subtraction unit 306 can be a hardware subtractor or a software subtraction program.

The reactive power control module 3 further has a third addition unit 307. The third addition unit 307 is electrically or signally connected to the fifth subtraction unit 306 and the reactive power consensus unit 302 for adding the reactive power output signal E4 and the reactive power consensus signal E2. The third addition unit 307 can be a hardware adder or a software addition program. The fifth subtraction unit 306, the third addition unit 307 and the voltage restoration unit 303 constitute a third closed loop.

The voltage restoration unit 303 has a fourth integral sub-unit 304. The fourth integral sub-unit 304 is electrically or signally connected to the third addition unit 307 for integrating the output of the third addition unit 307. The fourth integral sub-unit 304 can be a hardware integrator or a software integral program. Further, the voltage restoration unit 303 multiplies the output of the fourth integral sub-unit 304 by a voltage restoration constant 305 to generate the voltage differential restoration signal E3. The voltage differential restoration signal E3 is used to restore the voltage of the reactive power output signal E4.

The reactive power control module 3 further has a fifth integral unit 309. The fifth subtraction unit 309 is electrically or signally connected to the fifth subtraction unit 306. The reactive power control module 3 multiplies the reactive power output signal E4 by a reactive power droop constant 308 to generate a voltage differential signal $\dot{V}_i^*$, and the fifth integral unit 309 integrates the voltage differential signal $\dot{V}_i^*$ to generate a voltage difference signal $\Delta V_i$. The fifth integral unit 309 can be a hardware integrator or a software integral program.

The reactive power control module 3 further has a fourth addition unit 310. The fourth addition unit 310 is electrically or signally connected to the fifth integral unit 309 for adding the voltage difference signal $\Delta V_i$ and a voltage constant $V_{i,0}$ and thereby generating a voltage command signal $V_i^*$. The fourth addition unit 310 can be a hardware adder or a software addition program.

The reactive power control module 3 further has a sixth subtraction unit 311. The sixth subtraction unit 311 is electrically or signally connected to the fourth addition unit 310 for subtracting a voltage feedback signal $V_{i,dq}$ from the voltage command signal $V_i^*$ and thereby generating a voltage error signal E5. The sixth subtraction unit 311 can be a hardware subtractor or a software subtraction program.

The power control apparatus C13 (C) further has a modulation module 4 electrically or signally connected to the real power control module 2 and the reactive power control module 3. The modulation module 4 can be a hardware modulator or a software modulation program.

The modulation module 4 has a proportional integral (PI) control unit 401. The PI control unit 401 is electrically or signally connected to the sixth subtraction unit 311 of the reactive power control module 3 for changing the voltage error signal E5 into a current command signal F1.

The modulation module 4 further has a predictive current control unit 402. The predicative current control unit 402 is electrically or signally connected to the PI control unit 401 for generating a current output signal F2 according to the current command signal F1 and a current feedback signal $i_{i,dq}$.

The modulation module 4 further has a transformation frame unit 403. The transformation frame unit 403 is electrically or signally connected to the third integral unit 214 of the real power control module 2 and the predicative current control unit 402 for generating a control force signal F3 according to the current output signal F2 and the electric angle signal $\theta_i$ of the real power control module 2.

The modulation module 4 further has a PWM (Pulse Width Modulation) unit 404. The PWM unit 404 is electrically or signally connected to the transformation frame unit 403 for changing the control force signal F3 into a PWM signal m.

In the power control apparatuses C (for example, C3, C4, C5, C7, C10 and C13) and the power generating apparatuses G (for example, G3, G4, G5, G7, G10 and G13) of FIGS. 2 and 3, ideally, the power control apparatuses C adjust the ratios of the real power input signals $P_i$ (for example, $P_1, P_2, \ldots P_m$) to the real power control signals $P_i^*$ (for example, $P_1^*, P_2^*, \ldots P_m^*$) to be equal and adjust the ratios of the reactive power input signals $Q_i$ (for example, $Q_1, Q_2, \ldots Q_m$) to the reactive power control signals $Q_i^*$ (for example, $Q_1^*, Q_2^*, \ldots Q_m^*$) to be equal, thereby causing the real power input signals and the reactive power input signals of the power generating apparatuses G to become (or tend to become) uniform or have predetermined ratios. For example, a real power ratio equation (1) and a reactive power ratio equation (2) are shown as follows.

$$P_1/P_1^* = \ldots P_m/P_m^* \tag{1}$$

$$Q_1/Q_1^* = \ldots Q_m/Q_m^* \tag{2}$$

In equations (1) and (2), m represents the number of the power generating apparatuses G, $P_1$ to $P_m$ represent real power input signals of the power generating apparatuses G, $P_1^*$ to $P_m^*$ represent real power command signals of the power generating apparatuses G, $Q_1$ to $Q_m$ represent reactive power input signals of the power generating apparatuses G, and $Q_1^*$ to $Q_m^*$ represent reactive power command signals of the power generating apparatuses G.

Referring to FIGS. 2 and 3, the power control apparatuses C can generate second electric angle differential signals $\dot{\theta}_i$, real power command signals $P_i^*$, real power consensus signals D2 etc. according to a following real power equation (3), and generate reactive power command signals $Q_i^*$, reactive power consensus signals E2 etc. according to a following reactive power equation (4).

$$\begin{cases} \dot{\theta}_i = \omega_i \\ J_i \omega_b \dot{\omega}_i + D_{p,i} \dot{\theta}_i = P_i^* - P_i - p_i \\ k_{p,i} \dot{p}_i = J_i \omega_b \dot{\omega}_i + D_{p,i} \dot{\theta}_i + \sum_{j=1}^{m} l_{ij}\left(\frac{p_i}{D_{p,i}} - \frac{p_j}{D_{p,j}}\right) \end{cases} \quad (3)$$

$$\begin{cases} D_{q,i} V_i \dot{v}_i = Q_i^* - Q_i - q_i \\ k_{q,i} \dot{q}_i = D_{q,i} V_i \dot{v}_i + \sum_{j=1}^{m} l_{ij}\left(\frac{q_i}{D_{q,i}} - \frac{q_j}{D_{q,j}}\right) \end{cases} \quad (4)$$

In the above-described equations (3) and (4), i represents a denoted number (for example, 13) of the first power control apparatus C (for example, C13) or the first power generating apparatus G (for example, G13), j represents a denoted number (for example, 4) of the second power control apparatus C (for example, C4) or the second power generating apparatus G (for example, G4), $D_{p,i}$ represents a real power droop constant of the first power control apparatus C, $D_{p,j}$ represents a real power droop constant of the second power control apparatus C, $D_{q,i}$ represents a reactive power droop constant of the first power control apparatus C, $D_{q,j}$ represents a reactive power droop constant of the second power control apparatus C, $J_i$ represents a rotational inertia constant of the first power control apparatus C, $k_{p,i}$ represents a frequency restoration constant of the first power control apparatus C, $k_{q,i}$ represents a voltage differential restoration constant of the first power control apparatus C, $l_{ij}$ represents the first power control apparatus C is connected to the second power control apparatus C through a transmission line 1, $P_i$ represents a real power input signal of the first power generating apparatus G, $P_i^*$ represents a real power command signal of the first power control apparatus C, $p_i$ and $\omega_i$ represent frequency signals of the first power control apparatus C, $\dot{p}_i$ and $\dot{\omega}_i$ represent frequency differential signals of the first power control apparatus C, $p_j$ represents a frequency signal of the second power control apparatus C, $Q_i$ represents a reactive power input signal of the first power generating apparatus G, $Q_i^*$ represents a reactive power command signal of the first power control apparatus C, $q_i$ and $V_i$ represent voltage signals of the first power control apparatus C, $\dot{q}_i$ and $\dot{v}_i$ represent voltage differential signals of the first power control apparatus C, $\omega_b$ represent a frequency constant of the first power control apparatus C, and $\dot{\theta}_i$ represents a second electric angle differential signal of the first power control apparatus C.

The overall energy of the grid system 5 of FIG. 3 is calculated according to following energy equations (5), (6) and (7) so as to cause the overall energy of the grid system 5 to achieve stability.

$$U_1(x) = KE(\omega) + PE(y) \quad (5)$$

$$KE(\omega) = 1/2 \sum_{j=1}^{m} J_j \omega_j^2 \quad (6)$$

$$PE(y) = W_1(y) + W_2(y) + W_3(y) + W_4(p,q) \quad (7)$$

In the above-described equations (5) to (7), $U_1(x)$ represents overall energy of the grid system 5, $KE(\omega)$ represents kinetic energy of the grid system 5, and $PE(y)$ represents potential energy of the grid system 5. Further, $J_j$ represents a rotational inertia constant of a single power control apparatus C, m represents the number of the power generating apparatuses x and y represent variable vector signals of the grid system 5, $W_1$, $W_2$, $W_3$ and $W_4$ represent potential energies of the grid system 5, and $\omega_j$ represents a frequency signal of a single power control apparatus C.

Furthermore, the calculation is performed according to the equations (5) to (7) in combination with following equations (8) to (10).

$$\begin{cases} x_i = [\omega_i, y_i^T]^T, y_i = [\theta_i, p_i, v_i, q_i]^T \\ x^T = [\omega^T, y^T], y^T = [\theta^T, p^T, v^T, q^T] \end{cases} \quad (8)$$

$$v_i = \ln V_i \quad (9)$$

$$\begin{cases} W_1(y) = -\frac{1}{2}\left(\sum_{i=1}^{n} \sum_{j=1}^{n} (1+K^2) V_i V_j B_{ij} \cos\theta_{ij}\right) \\ W_2(y) = -\sum_{j=1}^{m}(P_j^* - KQ_j^*)\theta_j + \sum_{j=m+1}^{n}(P_{L,j} - KQ_{L,j})\theta_j \\ W_3(y) = -\sum_{j=1}^{m}(Q_j^* + KP_j^*)v_j + \sum_{j=m+1}^{n}(Q_{L,j} + KP_{L,j})v_j \\ W_4(p,q) = \frac{1}{2}\sum_{j=1}^{m}(p_j^2 + q_j^2). \end{cases} \quad (10)$$

In the above-described equations (8) to (10), $B_{ij}$ represents an admittance of a transmission line 1 of the grid system 5, K represents a ratio of resistance to inductance of the transmission line 1 of the grid system 5, m and n represent the number of the power generating apparatuses G, p and $\omega$ represent frequency signals of the grid system 5, $p_i$, $p_j$ and $\omega_i$ represent frequency signals of a single power control apparatus C, $P_j^*$ represents a real power command signal of a single power control apparatus C, $P_{L,j}$ represents the amount of real power of a single load S, q and v represent voltage signals of the grid system 5, $Q_j^*$ represents a reactive power command signal of a single power control apparatus C, $Q_{L,j}$ represents the amount of reactive power of a single load S, T represents transpose, $V_i$, $V_j$, $q_i$ and $q_j$ represent voltage signals of a single power control apparatus C, $v_i$ represents a natural logarithm of the voltage signal $V_i$, $v_j$ represents a natural logarithm of the voltage signal $V_j$, $x_i$ and $y_i$ represent variable vector signals of a single power control apparatus C, $\theta$ and $\theta_{ij}$ represent electric angle signals of the grid system 5, $\theta_i$ and $\theta_j$ represent electric angle signals of a single power control apparatus C.

Figure 4A:
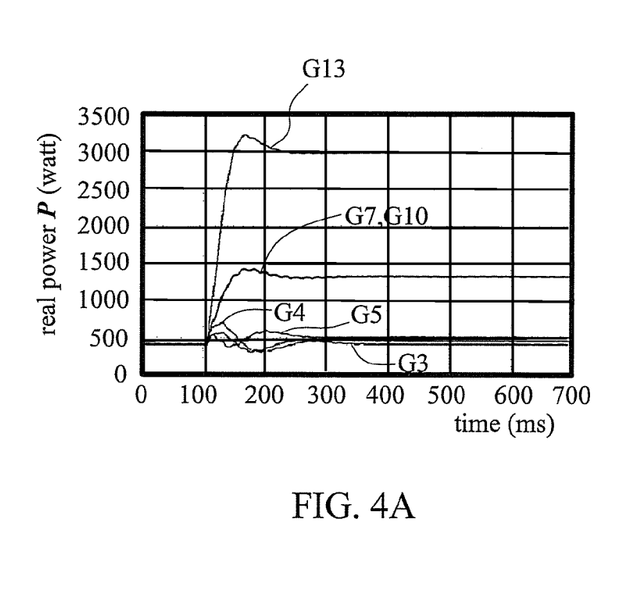
FIGS. 4A and 4B are schematic waveform diagrams of real power input signals of the power generating apparatuses of the grid system in cases when each of the power control apparatuses has a real power consensus unit and when it does not.
Figure 4B:
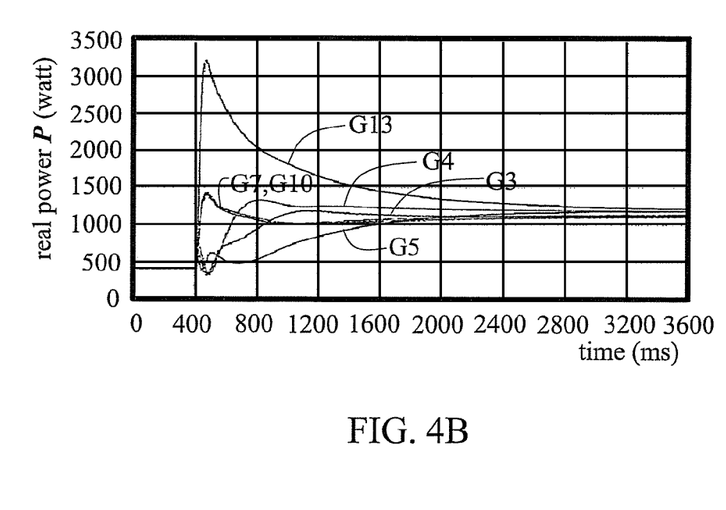

FIGS. 4A and 4B are schematic waveform diagrams of real power input signals of the power generating apparatuses G (for example, G3, G4, G5, G7, G10 and G13) of the grid system 5 in cases when each of the power control apparatuses C (for example, C3, C4, C5, C7, C10 and C13) has the real power consensus unit 202 of FIG. 2 and when it does not.

Referring to FIG. 4A, when each of the power control apparatuses C does not have the real power consensus unit 202 (the real power consensus signal D2) of FIG. 2, the real power input signals of the power generating apparatuses G are significantly different.

Referring to FIG. 4B, when each of the power control apparatuses C of FIG. 3 has the real power consensus unit 202 (the real power consensus signal D2) of FIG. 2, the real power input signals of the power generating apparatuses G become or tend to become uniform.

Figure 5A:
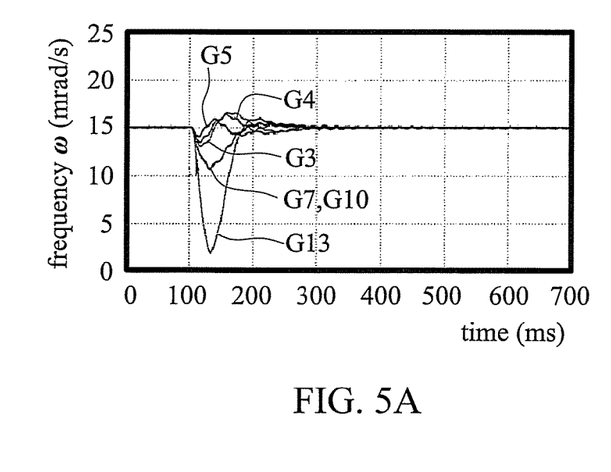
FIGS. 5A and 5B are schematic waveform diagrams of frequency signals of the power generating apparatuses of the grid system in cases when each of the power control apparatuses has a real power consensus unit and when it does not.
Figure 5B:
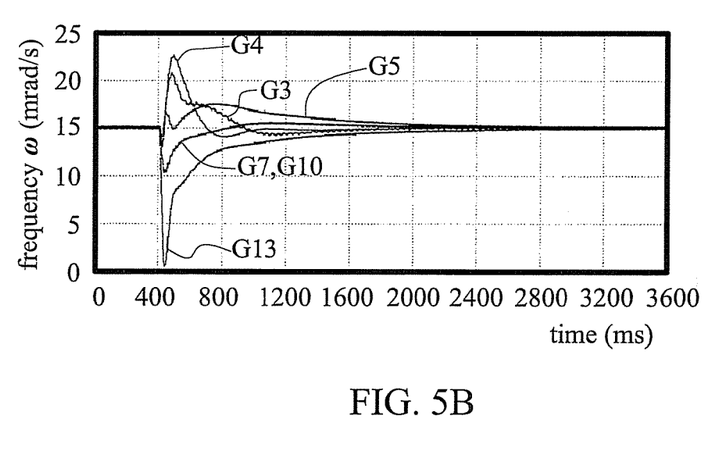

FIGS. 5A and 5B are schematic waveform diagrams of frequency signals of the power generating apparatuses G (for example, G3, G4, G5, G7, G10 and G13) of the grid system 5 in cases when each of the power control apparatuses C (for example, C3, C4, C5, C7, C10 and C13) has the real power consensus unit 202 of FIG. 2 and when it does not.

Referring to FIGS. 5A and 5B, the frequency signals of the power generating apparatuses G become or tend to become uniform no matter whether each of the power control apparatuses C has the real power consensus unit 202 (the real power consensus signal D2) of FIG. 2 or not.

Figure 6A:
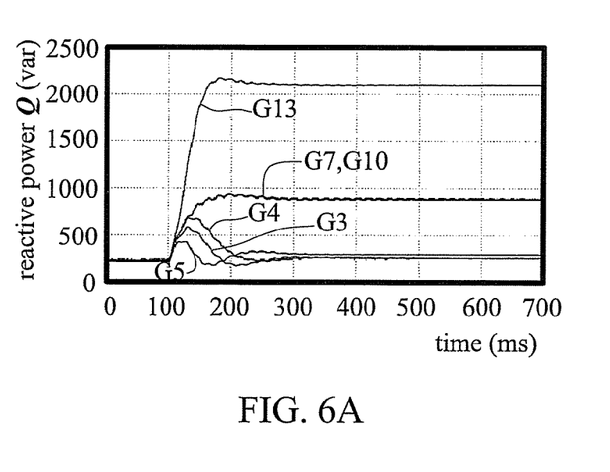
FIGS. 6A and 6B are schematic waveform diagrams of reactive power input signals of the power generating apparatuses of the grid system in cases when each of the power control apparatuses has a reactive power consensus unit and when it does not.
Figure 6B:
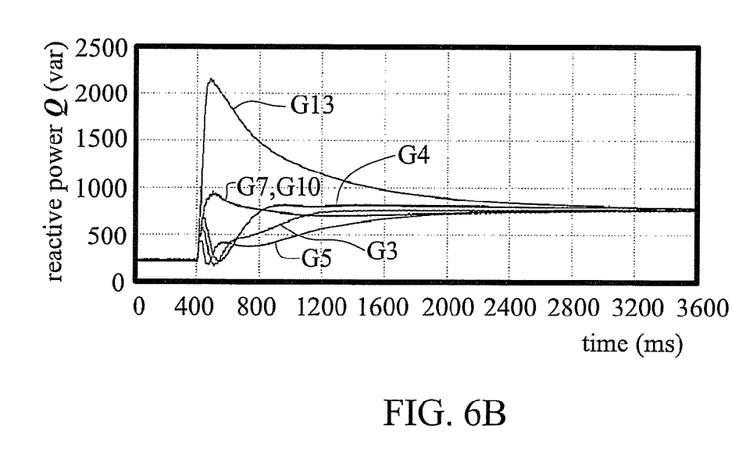

FIGS. 6A and 6B are schematic waveform diagrams of reactive power input signals of the power generating apparatuses G (for example, G3, G4, G5, G7, G10 and G13) of the grid system 5 in cases when each of the power control apparatuses C (for example, C3, C4, C5, C7, C10 and C13) has the reactive power consensus unit 302 of FIG. 2 and when it does not.

Referring to FIG. 6A, when each of the power control apparatuses C does not have the reactive power consensus unit 302 (the reactive power consensus signal E2) of FIG. 2, the reactive power input signals of the power generating apparatuses G are significantly different.

Referring to FIG. 6B, when each of the power control apparatuses C of FIG. 3 has the reactive power consensus unit 302 (the reactive power consensus signal E2) of FIG. 2, the reactive power input signals of the power generating apparatuses G become or tend to become uniform.

Figure 7A:
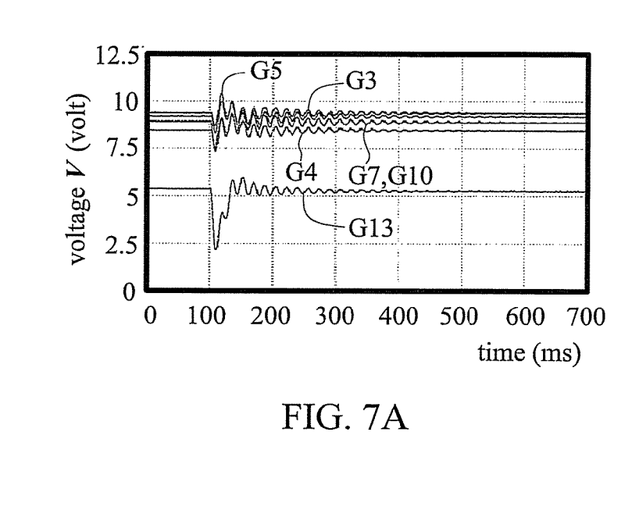
FIGS. 7A and 7B are schematic waveform diagrams of voltage output signals of the power generating apparatuses of the grid system in cases when each of the power control apparatuses has a reactive power consensus unit and when it does not.
Figure 7B:
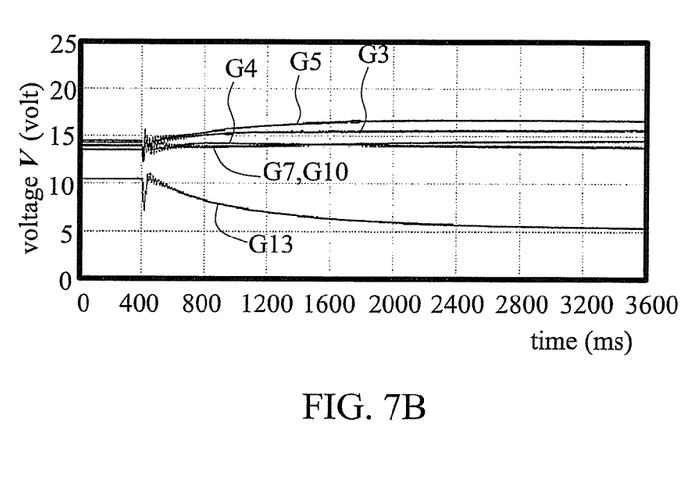

FIGS. 7A and 7B are schematic waveform diagrams of voltage output signals of the power generating apparatuses G (for example, G3, G4, G5, G7, G10 and G13) of the grid system 5 in cases when each of the power control apparatuses C (for example, C3, C4, C5, C7, C10 and C13) has the reactive power consensus unit 302 of FIG. 2 and when it does not.

Referring to FIGS. 7A and 7B, the difference between the voltage output signals of the power generating apparatuses G is not significant no matter whether each of the power control apparatuses C has the reactive power consensus unit 302 (the reactive power consensus signal E2) of FIG. 2 or not.

Figure 8:
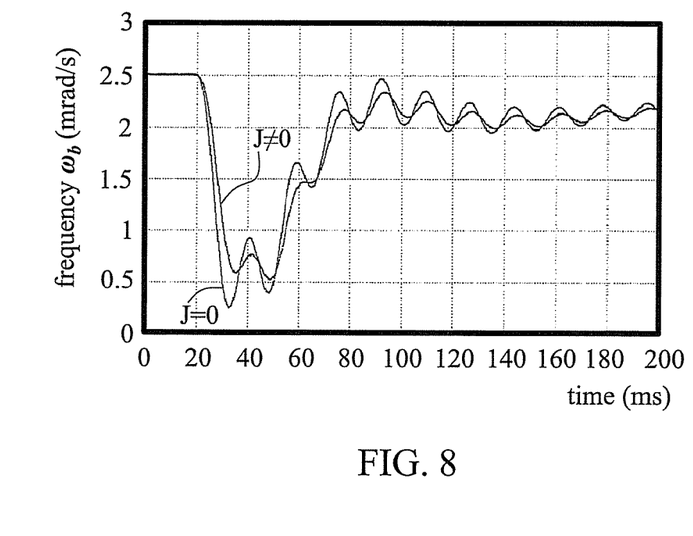
FIG. 8 is a schematic waveform diagram showing a comparison of different frequency signals of one of the power generating apparatuses of the grid system in cases when the corresponding power control apparatus has a virtual inertia unit and when it does not.

FIG. 8 is a schematic diagram showing a comparison of different frequency signals of one of the power generating apparatuses G (for example, G13) of the grid system 5 in cases when the corresponding power control apparatus C (for example, C13) has the virtual inertia unit 209 of FIG. 2 and when it does not.

Referring to FIG. 8, when the power control apparatus C of FIG. 3 does not have the rotational inertia constant of the virtual inertia unit 209 of FIG. 2 (i.e., J=0), the frequency signal of the power generating apparatus G has larger jitter and less stability. But when the power control apparatus C of FIG. 3 has the rotational inertia constant of the virtual inertia unit 209 of FIG. 2 (i.e., J≠0), the frequency signal of the power generating apparatus G has smaller jitter and greater stability.

Therefore, the consensus-based power control apparatus of the present invention can be applied in a grid system having a first power generating apparatus and at least a second power generating apparatus connected or adjacent to the first power generating apparatus. The real power control module of the power control apparatus has a real power consensus unit for providing a real power consensus signal between the first power generating apparatus and the second power generating apparatus, and the reactive power control module of the power control apparatus has a reactive power consensus unit for providing a reactive power consensus signal between the first power generating apparatus and the second power generating apparatus. As such, the present invention can control real power and reactive power input signals of the first power generating apparatus through the real power and reactive power consensus signals.

Further, when a plurality of power control apparatuses of the present invention are applied in a grid system having a plurality of power generating apparatuses, the power control apparatuses are capable of distributing real power and reactive power input signals of the power generating apparatuses so as to cause the real power and reactive power input signals of the power generating apparatuses to become (or tend to become) uniform or have predetermined ratios and cause the overall energy of the grid system to achieve stability.

Furthermore, the power control apparatus of the present invention has a virtual inertia unit for providing a suitable inertia for the first power generating apparatus so as to cause frequency signals of the first power generating apparatus to have smaller jitter and greater stability.

The above-described descriptions of the detailed embodiments are only to illustrate the preferred implementation according to the present invention, and it is not to limit the scope of the present invention. Accordingly, all modifications and variations completed by those with ordinary skill in the art should fall within the scope of present invention defined by the appended claims.

What is claimed is:

1. A consensus-based power control apparatus applicable to a grid system having a first power generating apparatus and at least a second power generating apparatus, the power control apparatus comprising:

a real power controller configured to provide a real power command signal and receiving a real power input signal of the first power generating apparatus, wherein the real power controller comprises:

a real power consensus unit configured to provide a real power consensus signal between the first power generating apparatus and the second power generating apparatus; and a frequency restoration unit configured to generate a frequency restoration signal according to the real power consensus signal, thereby allowing the real power controller to generate a first real power output signal of the first power generating apparatus according to the real power command signal, the real power input signal and the frequency restoration signal; and a reactive power controller configured to provide a reactive power command signal and receiving a reactive power input signal of the first power generating apparatus, wherein the reactive power controller comprises:

a reactive power consensus unit configured to provide a reactive power consensus signal between the first power generating apparatus and the second power generating apparatus; and a voltage restoration unit configured to generate a voltage differential restoration signal according to the reactive power consensus signal, thereby allowing the reactive power controller to generate a reactive power output signal of the first power generating apparatus according to the reactive power command signal, the reactive power input signal and the voltage differential restoration signal, wherein the real power controller further comprises:

a first subtraction unit configured to subtract the real power input signal from the real power command signal to generate a real power difference signal; and a second subtraction unit configured to subtract the frequency restoration signal from the real power difference signal to generate the first real power output signal.

2. The apparatus of claim 1, wherein the real power controller further comprises a first addition unit and the frequency restoration unit further comprises a first integral sub-unit, the first addition unit adding the first real power output signal and the real power consensus signal, the first integral sub-unit integrating the output of the first addition unit, and the frequency restoration unit multiplying the output of the first integral sub-unit by a frequency restoration constant to generate the frequency restoration signal.

3. A consensus-based power control apparatus applicable to a grid system having a first power generating apparatus and at least a second power generating apparatus, the power control apparatus comprising:
- a real power controller configured to provide a real power command signal and receiving a real power input signal of the first power generating apparatus, wherein the real power controller comprises:
  - a real power consensus unit configured to provide a real power consensus signal between the first power generating apparatus and the second power generating apparatus; and
  - a frequency restoration unit configured to generate a frequency restoration signal according to the real power consensus signal, thereby allowing the real power controller to generate a first real power output signal of the first power generating apparatus according to the real power command signal, the real power input signal and the frequency restoration signal; and
- a reactive power controller configured to provide a reactive power command signal and receiving a reactive power input signal of the first power generating apparatus, wherein the reactive power controller comprises:
  - a reactive power consensus unit configured to provide a reactive power consensus signal between the first power generating apparatus and the second power generating apparatus; and
  - a voltage restoration unit configured to generate a voltage differential restoration signal according to the reactive power consensus signal, thereby allowing the reactive power controller to generate a reactive power output signal of the first power generating apparatus according to the reactive power command signal, the reactive power input signal and the voltage differential restoration signal,
- wherein the real power controller further comprises a third subtraction unit configured to subtract a first electric angle differential signal from the first real power output signal to generate a second real power output signal of the first power generating apparatus.

4. The apparatus of claim 3, wherein the real power controller further comprises: a virtual inertia unit configured to multiply the second real power output signal by an inertia constant to generate a frequency differential signal; and a second integral unit configured to integrate the frequency differential signal to generate a second electric angle differential signal, thereby allowing the real power controller to multiply the second electric angle differential signal by a real power droop constant to generate the first electric angle differential signal.

5. The apparatus of claim 4, wherein the real power controller further comprises: a second addition unit configured to add the second electric angle differential signal and a frequency constant; and a third integral unit configured to integrate the output of the second addition unit to generate an electric angle signal.

6. The apparatus of claim 3, wherein the reactive power controller further comprises: a fourth subtraction unit configured to subtract the reactive power input signal from the reactive power command signal to generate a reactive power difference signal; and a fifth subtraction unit configured to subtract the voltage differential restoration signal from the reactive power difference signal to generate the reactive power output signal.

7. The apparatus of claim 3, wherein the reactive power controller further comprises a third addition unit and the voltage restoration unit further comprises a fourth integral sub-unit, the third addition unit adding the reactive power output signal and the reactive power consensus signal, the fourth integral sub-unit integrating the output of the third addition unit, and the voltage restoration unit multiplying the output of the fourth integral sub-unit by a voltage restoration constant to generate the voltage differential restoration signal.

8. The apparatus of claim 3, wherein the reactive power controller further comprises a fifth integral unit, the reactive power controller multiplying the reactive power output signal by a reactive power droop constant to generate a voltage differential signal and the fifth integral unit integrating the voltage differential signal to generate a voltage difference signal.

9. The apparatus of claim 8, wherein the reactive power controller further comprises: a fourth addition unit configured to add the voltage difference signal and a voltage constant to generate a voltage command signal; and a sixth subtraction unit configured to subtract a voltage feedback signal from the voltage command signal to generate a voltage error signal.

10. A consensus-based power control apparatus applicable to a grid system having a first power generating apparatus and at least a second power generating apparatus, the power control apparatus comprising:
- a real power controller configured to provide a real power command signal and receiving a real power input signal of the first power generating apparatus, wherein the real power controller comprises:
  - a real power consensus unit configured to provide a real power consensus signal between the first power generating apparatus and the second power generating apparatus; and
  - a frequency restoration unit configured to generate a frequency restoration signal according to the real power consensus signal, thereby allowing the real power controller to generate a first real power output signal of the first power generating apparatus according to the real power command signal, the real power input signal and the frequency restoration signal; and
- a reactive power controller configured to provide a reactive power command signal and receiving a reactive power input signal of the first power generating apparatus, wherein the reactive power controller comprises:
  - a reactive power consensus unit configured to provide a reactive power consensus signal between the first power generating apparatus and the second power generating apparatus;
  - a voltage restoration unit configured to generate a voltage differential restoration signal according to the reactive power consensus signal, thereby allowing the reactive power controller to generate a reactive power output signal of the first power generating apparatus according to the reactive power command signal, the reactive power input signal and the voltage differential restoration signal; and a modulator having a proportional integral (PI) control unit configured to change a voltage error signal of the reactive power controller into a current command signal and a predictive current control unit configured to generate a current output signal according to the current command signal and a current feedback signal.

11. The apparatus of claim 10, wherein the modulator further has: a transformation frame unit configured to generate a control force signal according to the current output signal and an electric angle signal of the real power controller; and a PWM (Pulse Width Modulation) unit for changing the control force signal into a PWM signal.

* * * * *